April 1, 1930.　　　C. TAYLOR　　　1,752,582
ICE CREAM FREEZER
Filed Dec. 16, 1926　　　3 Sheets-Sheet 3
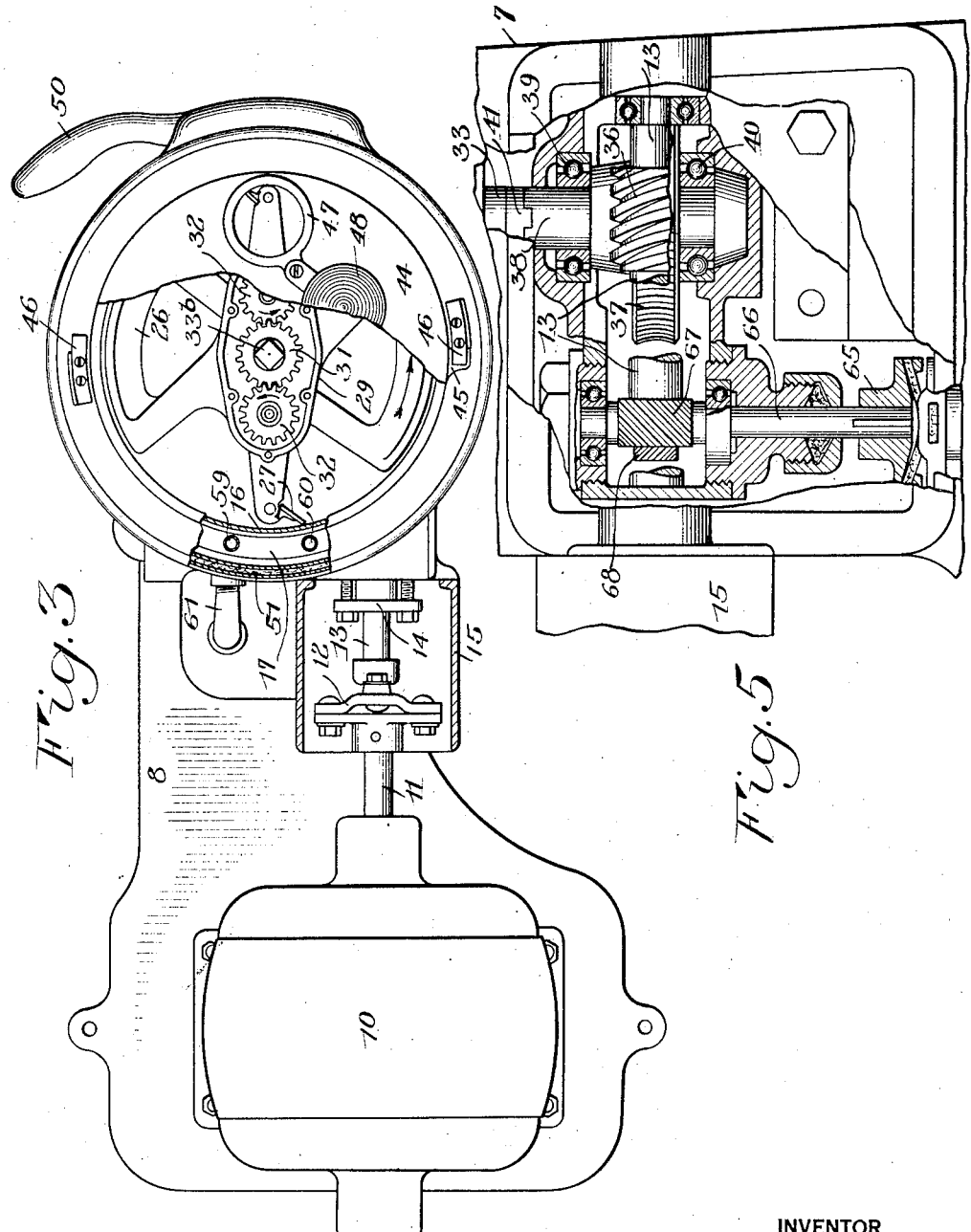
INVENTOR
Charles Taylor
BY Peppard Powers
his ATTORNEYS Patented Apr. 1, 1930

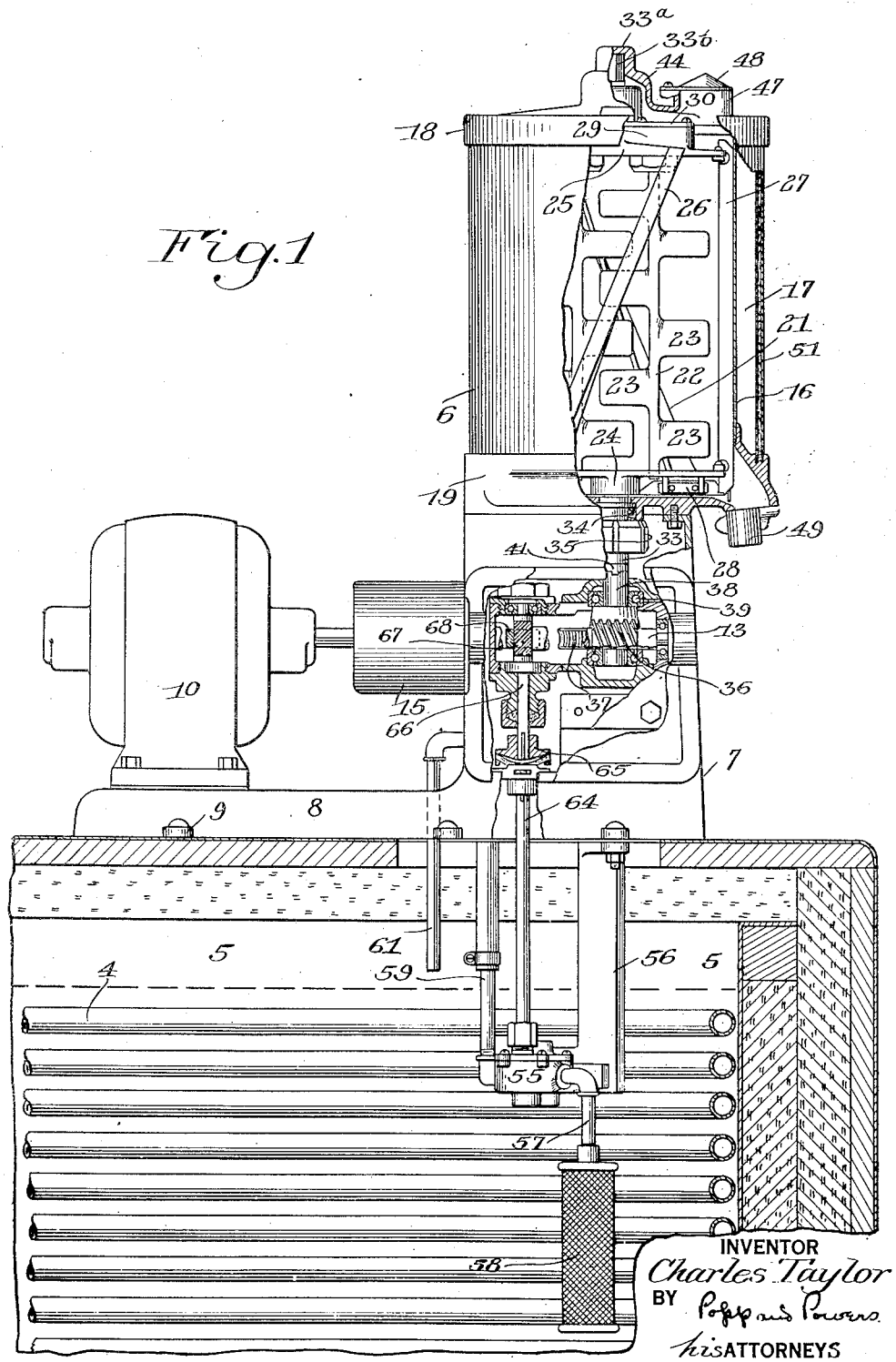

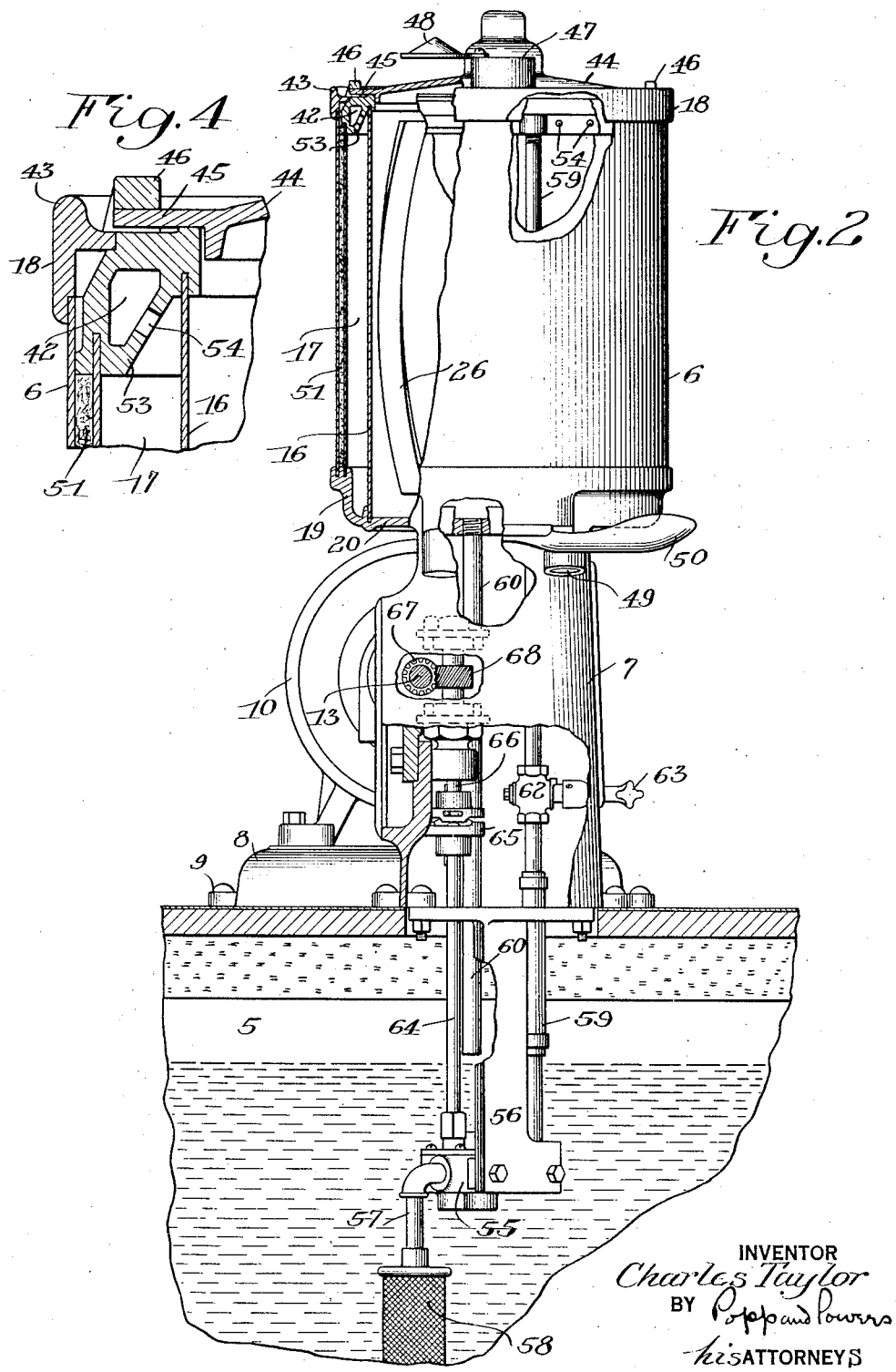

1,752,582

UNITED STATES PATENT OFFICE

CHARLES TAYLOR, OF BUFFALO, NEW YORK, ASSIGNOR TO TAYLOR FREEZER CORPORATION, OF BELOIT, WISCONSIN, A CORPORATION OF DELAWARE

ICE-CREAM FREEZER

Application filed December 16, 1926. Serial No. 155,361.

This invention relates to improvements in ice cream freezers and proposes a construction which is especially adapted for use in connection with the ice cream freezing system which forms the subject of my co-pending application Ser. No. 145,426 but which is not necessarily limited to use in such environment.

The principal object of the invention is to provide an ice cream freezer which may be conveniently charged with the ice cream mixture and readily and quickly discharged, which may utilize any suitable local refrigerating system, which will operate rapidly and effectively in freezing the ice cream mixture to the desired consistency and whipping it up to improve its texture, which may be readily cleaned, and which in general is adapted to the manufacture of ice cream in retail establishments.

An embodiment of the invention is illustrated in the accompanying drawings in which Figure 1 is a side elevation of the freezer with parts broken away and in section in order to show details of construction, this view also combining a fragmentary section of the brine reservoir;

Figure 2 is an elevation and partial section at right angles to Figure 1;

Figure 3 is a plan view partly in section;

Figure 4 is an enlarged detail section of the upper portion of the freezer;

Figure 5 is an enlarged view partly in section and partly in elevation of the enclosed gearing for the operation of the freezer and the brine pump.

As shown, the freezer, indicated generally at 6, is supported upon the top wall of a brine reservoir 5 which may be incorporated with a suitable ice cream storage cabinet, the brine being chilled by a suitable expansion coil 4 connected to a compressor (not shown) having the usual stop and start arrangement. The freezer is directly supported by a hollow standard 7 which provides a housing for a number of the operating parts and which extends upright from a base or bed 8 suitably secured as by fastenings 9 to the top wall of the reservoir 5. The power for the operation of the freezer is preferably furnished by an electric motor 10 secured on one end of the base 8 and having a projecting shaft 11 connected by a suitable flexible coupling 12 to the main drive shaft 13 which enters the casing 7 through a suitable stuffing box 14. The coupling 12 and the projecting part of the shaft 13 are preferably enclosed in a guard casing 15 attached to the standard 7. The freezer 6 as shown and preferred utilizes brine from the reservoir 5 for freezing the ice cream to the desired consistency. It, therefore, includes in addition to the freezing chamber 16, an outer chamber 17 for the circulation of the brine in a manner to be hereafter explained. The annular walls of the chamber 16 and 17 are secured to an upper head indicated generally at 18 and a base 19 which provides the bottom 20 of the freezing chamber 16.

The freezer structure includes a rotating dasher which is indicated generally at 21 and beater shafts 22 which have operating arms 23. The dasher 21 comprises a lower head 24, an upper head 25 and spirally arranged dasher bars 26 extending between and secured to said heads. The heads 24 and 25 also support pivotally mounted scrapers 27 which operate against the cylindrical wall of the freezing chamber 16 and the head 24 supports a horizontal scraper 28 which operates against the bottom of said chamber. The beater shafts 22 are journaled in the heads 24 and 25 and during their movement with the dasher are also rotated by the dasher about their axial centers. For this purpose the head 25 is formed to provide the vertical walls of a gear casing 29 which is completed by a cap plate 30 and encloses a stationary central pinion 31 and two pinions 32 arranged at opposite sides of the central pinion. The pinion 31 is mounted fast on a fixed arbor 33ᵇ which extends through an opening in the cap plate 30 and the pinions 32 are mounted fast on the upper ends of the beater shafts 22. As the head 25 rotates, carrying the beater shafts with it, the pinions 32 are driven by the fixed pinion 31 about which they revolve and by their rotation drive the beater shafts.

The lower head 24 is keyed or otherwise made fast to the dasher drive shaft 33 which is journaled in the freezer wall 20 and projects into the standard 7, a suitable stuffing box 34 and gland nut 35 being provided to prevent leakage of the ice cream mixture past said shaft. The gearing for driving the dasher drive shaft 33 comprises a worm 36 mounted on the main drive shaft 13, a worm wheel 37 driven by the worm 36 and a worm wheel shaft 38 having suitable bearings at 39 and 40 in supporting parts which are mounted within the standard 7. The worm wheel shaft 38 is connected by any suitable direct coupling 41 to the dasher drive shaft 33.

The upper head 18 of the freezer includes a hollow brine distributing ring 42 and a retaining ring 43 encircling the ring 42. The freezer chamber 16 is closed at its top by a cover 44 which is supported on the ring 42 and is provided with marginal projections 45 for cooperation with overhanging clamping lugs 46 carried by the ring 42. A slight turn of the cover 44 disengages the projections 45 from the lugs 46 and permits the cover to be lifted from the freezer. The cover is formed with a central socket 33ª in which the square end of the arbor 33 has a conforming fit, the arbor being thereby held against rotation. The cover 44 is provided with a filling nipple 47 which is normally closed by a pivoted cap 48 and through which the ice cream mixture is introduced into the freezing chamber 16. At its lower end the freezer is provided with a discharge spout 49 which is normally closed by a suitable gate valve 50 and through which the partly frozen mixture is discharged in a semi-fluid state.

The freezer is constructed with a suitably insulated outer wall 51 which provides the above mentioned brine chamber 17 in surrounding relation to the freezing chamber 16. The ring 42 closes the brine chamber 17 at its upper end and is formed with a bottom wall 53 which is inclined downward away from the wall of the chamber 16 and is provided with a suitable number of regularly arranged brine discharge apertures 54 through which the brine issues in jets so directed as to impinge against the wall of the chamber 16 near the top thereof, the brine thence flowing downward along the wall of the chamber 16 and withdrawing heat from said chamber.

The brine is supplied to the ring 42 from the reservoir 5 by means of a brine pump 55 which may be of any suitable construction and arrangement. The pump is sufficiently shown by the illustration of its casing and may be supported within the brine reservoir by a hanger bar 56 depending from the bottom of the standard 7. The intake 57 preferably carries a screen 58 and extends downward to a suitable point in the brine reservoir. The pump is connected to the ring 42 by a pipe 59 which extends through the standard 7 and the freezer brine chamber 17 and the brine from said chamber is returned to the reservoir 5 by a pipe 60 which extends through the standard 7 and has a discharge capacity conforming to that of the ring 42. In order that the mechanism of the freezer may be operated independently of the refrigerating system the pipe 59 is connected to a brine return pipe 61 which diverts the brine from the freezer and discharges it into the reservoir 5, the connection between the pipes 59 and 61 being controlled by a suitable three-way valve 62 having an externally accessible operating handle 63.

The pump drive shaft 64 is directly connected to a suitable flexible coupling 65 to an operating shaft 66 suitably mounted in the standard 7 and in turn driven by spiral gears 67 and 68 from the main drive shaft 13.

The ice cream mixture is poured from a suitable container into the freezing chamber 16 through the nipple 47 after which the cap 48 is closed and the motor is started to cause the operation of the freezer mechanism, the valve 62 being operated at such time to connect the pump 55 and sprinkler ring 42 whereby the brine will be discharged against the wall of the chamber 16 in the manner and with the effect described, the brine being returned to the reservoir by the drain pipe 60. The operation of the freezer mechanism in connection with the discharge of brine from the ring 42 is continued until the mixture has been frozen to a semi-fluid consistency whereupon the valve 62 is operated to disconnect the ring 42 from the pump and to cause the brine to return to the reservoir through the by-pass 61. The freezer mechanism is then continued in operation without any refrigerating effect for the purpose of whipping up the mixture and improving its flavor and texture. When this has progressed to the extent desired the gate valve 50 is opened to permit the discharge of the mixture through the spout 49 into a suitable vessel, such discharge being aided by the rotating bottom scraper 28. The vessel into which the frozen mixture is discharged may then be placed in any suitable refrigerating cabinet where it is allowed to remain until the mixture has hardened to the degree desired. Instead of discharging the mixture into a vessel and hardening the ice cream in bulk, the mixture may be discharged into brick molds, special molds or cups.

Having fully described my invention, I claim:

1. An ice cream freezer having a freezing chamber, a dasher frame therein comprising upper and lower heads and connecting bars, means connected to the lower of said heads for rotating said dasher frame, beater shafts journaled in said heads, the upper of said heads providing an enclosed gear case, a fixed pinion mounted in said gear case in non-rotatable relation to said chamber, pinions mounted on said beater shafts and in mesh with said fixed pinion and beater blades on said shafts arranged in staggered relation and adapted for rotation across the center line of the chamber.

2. An ice cream freezer having a freezing chamber, a top cover therefor, a dasher frame therein comprising upper and lower heads and connecting bars, means connected to the lower head for rotating said dasher frame, beater shafts journaled in said heads, the upper head providing an enclosed gear case, a central pinion in said gear case having an arbor non-rotatably fitted in said top cover, pinions mounted on said beater shafts and in mesh with said central pinion and beater blades on said shafts.

3. An ice cream freezer comprising a freezing chamber, a propelling shaft extending upwardly through the bottom of the chamber, a dasher frame having upper and lower heads spaced apart and connected by bars extending therebetween through the peripheral portions of said chamber, said lower head being engaged with the upper end of said shaft to be propelled thereby and constructed to propel the upper head by means of said bars, an enclosed gear case carried by said upper head, a non-rotatable pinion in said gear case connected non-rotatably to the top of said chamber, vertical beater shafts journaled in said heads, pinions in said gear case meshed with said non-rotatable pinion and respectively affixed to the upper ends of said beater shafts, and beater blades on said beater shafts some of which are arranged to intersect the center line of the chamber to assure thorough beating in the central portion of the chamber.

4. An ice cream freezer comprising a freezing chamber, a propelling shaft extending upwardly through the bottom of the chamber, a dasher frame having upper and lower heads spaced apart and connected by bars extending therebetween through the peripheral portions of said chamber, said lower head being engaged with the upper end of said shaft to be propelled thereby and constructed to propel the upper head by means of said bars, an enclosed gear case carried by said upper head, a non-rotatable pinion in said gear case connected non-rotatably to the top of said chamber, vertical beater shafts journaled in said heads, pinions in said gear case meshed with said non-rotatable pinion and respectively affixed to the upper ends of said beater shafts, and beater blades on said beater shafts, several of the blades on each shaft being arranged to intersect the center line of the chamber to assure thorough and uniform beating in the central portion of the chamber.

5. An ice cream freezer comprising a non-rotatable freezing chamber, a detachable stationary cover therefor, a propelling shaft extending upwardly through the bottom of the chamber, a dasher frame having upper and lower heads spaced apart and connected by bars extending therebetween through the peripheral portions of said chamber, said lower head being engaged with the upper end of said shaft to be propelled thereby and constructed to propel the upper head by means of said bars, an enclosed gear case carried by said upper head, a non-rotatable pinion in said gear case connected non-rotatably to the cover of said chamber, vertical beater shafts journaled in said heads, pinions in said gear case meshed with said non-rotatable pinion and respectively affixed to the upper ends of said beater shafts, and beater blades on said beater shafts some of which are arranged to intersect the center line of the chamber to assure thorough beating in the central portion of the chamber, the dasher frame together with the gear case and beaters being removable from said chamber as a unit whenever said cover has been removed.

6. An ice cream freezer comprising a non-rotatable freezing chamber, a detachable stationary cover therefor, a propelling shaft extending upwardly through the bottom of the chamber, a dasher frame having upper and lower heads spaced apart and connected by bars extending therebetween through the peripheral portions of said chamber, said lower head being engaged with the upper end of said shaft to be propelled thereby and constructed to propel the upper head by means of said bars, an enclosed gear case carried by said upper head, a non-rotatable pinion in said gear case connected non-rotatably to the cover of said chamber, vertical beater shafts journaled in said heads, pinions in said gear case meshed with said non-rotatable pinion and respectively affixed to the upper ends of said beater shafts, and beater blades on said beater shafts, several of the blades on each shaft being arranged to intersect the center line of the chamber to assure thorough and uniform beating in the central portion of the chamber, the dasher frame together with the gear case and beaters being removable from said chamber as a unit whenever said cover has been removed.

7. An ice cream freezer having a non-rotatable freezing chamber, a top cover therefor removably engaged therewith and having a recess in its lower face, a dasher frame therein comprising upper and lower heads and connecting bars, means connected to the lower head for rotating said dasher frame, beater shafts journaled in said heads, the upper head providing an enclosed gear case, a central pinion in said gear case having an arbor non-rotatably engaged with said recess, pinions mounted on said beater shafts and in mesh with said central pinion, and beater blades on said shafts.

8. In an ice cream freezer having a freezing chamber, a dasher frame comprising upper and lower heads and a rigid element connecting said heads, beater shafts journalled in said heads, pinion gears mounted on adjacent ends of said shafts adjacent one head adapted for rotation relatively to said frame, another pinion gear in mesh with the first said pinion gears and mounted non-rotatably relatively to said chamber, and means for causing relative rotational movement of said frame and said chamber including means rigidly connected to the other head.

9. In an ice cream freezer having a freezing chamber, a dasher frame having heads at opposite ends of said chamber and a rigid element connecting said heads, beater shafts journalled in said heads, pinion gears mounted on adjacent ends of said shafts adjacent one head adapted for rotation relatively to said frame, another pinion gear in mesh with the first said pinion gears and mounted non-rotatably relatively to said chamber, and means for causing relative rotational movement of said frame and said chamber including means rigidly connected to the other head.

10. In an ice cream freezer having a freezing chamber, a beater frame having upper and lower heads and a rigid element connecting said heads, beater shafts journalled in said heads, pinion gears mounted on said shafts adjacent the upper head, another pinion gear in mesh with the first said pinion gears and mounted non-rotatably relatively to said chamber, and means for causing relative rotational movement of said frame and said chamber including means extending upwardly through the bottom of said chamber rigidly connected with the lower head.

11. In an ice cream freezer having a freezing chamber, a dasher frame having heads at opposite ends of said chamber and a rigid element connecting said heads, beater shafts journalled in said heads, pinion gears mounted on adjacent ends of said shafts adjacent one head adapted for rotation relatively to said frame, another pinion gear in mesh with the first said pinion gears and mounted non-rotatably relatively to said chamber, and means for causing relative rotational movement of said frame and said chamber including means connected to the other head.

In testimony whereof I affix my signature.

CHARLES TAYLOR.